(12) United States Patent
Ayaki

(10) Patent No.: US 8,411,159 B2
(45) Date of Patent: Apr. 2, 2013

(54) METHOD OF DETECTING SPECIFIC OBJECT REGION AND DIGITAL CAMERA

(75) Inventor: Kenichiro Ayaki, Saitama (JP)

(73) Assignee: FUJIFILM Corporation, Tokyo (JP)

(*) Notice: Subject to any disclaimer, the term of this patent is extended or adjusted under 35 U.S.C. 154(b) by 613 days.

(21) Appl. No.: 11/877,375

(22) Filed: Oct. 23, 2007

(65) Prior Publication Data

US 2008/0100721 A1     May 1, 2008

(30) Foreign Application Priority Data

Oct. 25, 2006    (JP) ................................ 2006-289594

(51) Int. Cl.
*H04N 5/228* (2006.01)
*G06K 9/00* (2006.01)
(52) U.S. Cl. ...................................... 348/222.1; 382/181
(58) Field of Classification Search ............. 348/208.12, 348/208.14, 222.1, 135, 142, 169; 382/103, 382/118, 165, 170, 181
See application file for complete search history.

(56) References Cited

U.S. PATENT DOCUMENTS

| 4,203,671 | A | 5/1980 | Takahashi et al. | |
| 4,244,654 | A | 1/1981 | Asai et al. | |
| 4,244,655 | A | 1/1981 | Asai et al. | |
| 5,278,921 | A | 1/1994 | Nakamura et al. | |
| 2006/0078224 | A1* | 4/2006 | Hirosawa | 382/284 |
| 2007/0025722 | A1* | 2/2007 | Matsugu et al. | 396/263 |

FOREIGN PATENT DOCUMENTS

| CN | 1682528 A | 10/2005 |
| JP | 52-156624 A | 12/1977 |
| JP | 53-145621 A | 12/1978 |
| JP | 53-145622 A | 12/1978 |
| JP | 4-346333 A | 12/1992 |
| JP | 8-63597 A | 3/1996 |
| JP | 2001-116985 A | 4/2001 |
| JP | 2004-171490 A | 6/2004 |

OTHER PUBLICATIONS

Notification of the Second Office Action, dated Apr. 13, 2011, issued in corresponding CN Application No. 200710181208.8, 12 pages.

* cited by examiner

*Primary Examiner* — Chieh M Fan
*Assistant Examiner* — Akshay Trehan
(74) *Attorney, Agent, or Firm* — Sughrue Mion, PLLC

(57) ABSTRACT

A digital still camera for photographing an image of an object is provided. A motion vector detector acquires a change of a position of the object in the image between a first picture frame and a previous picture frame recorded prior thereto. A normalizer normalizes the previous picture frame according to a parameter related to the change of the position. A specific object detector detects a specific object region, such as a facial image region, according to image recognition and by comparison between the first picture frame and the normalized previous picture frame. Furthermore, a change of a magnification of the image thereof is acquired between the first picture frame and the previous picture frame recorded prior thereto. The normalizer normalizes the previous picture frame according to a parameter related to the change of the magnification.

7 Claims, 19 Drawing Sheets

METHOD OF DETECTING SPECIFIC OBJECT REGION AND DIGITAL CAMERA

BACKGROUND OF THE INVENTION

1. Field of the Invention

The present invention relates to a method of detecting a specific object region and digital camera. More particularly, the present invention relates to a method of detecting a specific object region and digital camera in which the specific object region is detected according to image data, and in which an amount of a task of arithmetic operation and memory resource can be reduced.

2. Description Related to the Prior Art

U.S. Pat. No. 4,203,671 (corresponding to JP-A 52-156624), U.S. Pat. No. 4,244,654 (corresponding to JP-A53-145621) and U.S. Pat. No. 4,244,655 (corresponding to JP-A53-145622) disclose a method of detecting portions of flesh color from an original image as detection of a facial image region from the image, to determine a facial image from a collected portion of photometric points in a region in the flesh color. U.S. Pat. No. 5,278,921 (corresponding to JP-A 4-346333) discloses a method of detecting a facial image region by conversion of photometric data into information of hue and chroma, to create and analyze a histogram of two dimensions. JP-A 8-063597 discloses a method of deriving candidate regions of facial image regions by considering a human facial shape so as to determine a facial image region according to characteristic values in the candidate regions.

In any of those methods, the total of each image must be processed by image processing for the purpose of recognizing a specific object in the image. Even CPU or calculating devices with high performance require long time, because the amount of the calculation is considerably great.

JP-A 2001-116985 discloses a camera and object recognition. The camera includes an object recognition unit, a visual line recognition unit, a visual line detector and an image cropping unit. The object recognition unit recognizes an object. The image cropping unit determines a recognizing position and range of the object recognition unit according to outputs from the visual line recognition unit and the visual line detector. The object recognition unit and the image cropping unit cooperate to determine the position of the object to recognition at a high speed and high precision.

JP-A 2004-171490 discloses a method in which the irrelevant images and the target images are predetermined. The irrelevant images are among a plurality of consecutive picture frames, and are eliminated from consideration in which a specific object is searched. The target images are among the plural consecutive picture frames, and are searched as a target for detecting the specific object. The target images are sequentially arranged between two or more of the irrelevant images at a predetermined period, to reduce the total of the task of arithmetic operation. After one of the target images of which the specific object is detected, points located close to the detected specific object are searched, which is effective also in reducing the total of the task.

However, there remain problems in those known methods. In JP-A 2001-116985, an error may occur in the object recognition of a principal object typically when two or more object exist. Failure occurs when the principal object is offset from the position of the visual line of recognition. In JP-A 2004-171490, a problem is caused by the process of thinning itself. The target images are handled in the widely known manner, so that there is no reduction of the task of the calculation. The problem of JP-A 2001-116985 remains also with JP-A 2004-171490 in relation to the points close to the specific object.

SUMMARY OF THE INVENTION

In view of the foregoing problems, an object of the present invention is to provide a method of detecting a specific object region and digital camera in which the specific object region is detected according to image data, and in which an amount of a task of arithmetic operation and memory resource can be reduced.

In order to achieve the above and other objects and advantages of this invention, a detecting method of detecting a specific object region located in a picture frame recorded by an image sensor is provided. In the detection method, picture frames are created by picking up an object sequentially. A shift amount is acquired between a present picture frame presently created among the picture frames and a previous picture frame created prior to the present picture frame among the picture frames. An outline frame defined around the previous picture frame is shifted according to the shift amount on the previous picture frame, to form a normalized picture frame from an image region surrounded in the outline frame after shifting. A difference is retrieved between the present picture frame and the normalized picture frame, to detect a difference region being according to the difference and included in the present picture frame. The specific object region is detected in the difference region.

Information of the specific object region is stored sequentially for the picture frames created by pickup in a manner of renewal. In case of lack of the difference region in the difference region detection for the present picture frame, information of a specific object region obtained in relation to the previous picture frame is retrieved for the present picture frame.

Pattern matching of image recognition is used in detecting the specific object region from the difference region.

An amount of shifting of a casing in which the image sensor is incorporated is measured from photographing the previous picture frame to photographing the present picture frame, and is used for the shift amount between the present picture frame and the previous picture frame.

Preferably, the specific object region is a human facial image region.

The image sensor has a large pickup area containing a photographable area for picking up an image to be observed in playback, and the previous picture frame and the present picture frame are picked up in the large pickup area.

In one preferred embodiment, a digital camera for pickup of a picture frame is provided, and includes an image sensor for creating picture frames by picking up an object sequentially. An input unit acquires a shift amount between a present picture frame presently created among the picture frames and a previous picture frame created prior to the present picture frame among the picture frames. A normalizer shifts an outline frame defined around the previous picture frame according to the shift amount on the previous picture frame, to form a normalized picture frame from an image region surrounded in the outline frame after shifting. A difference region detector retrieves a difference between the present picture frame and the normalized picture frame, to detect a difference region being according to the difference and included in the present picture frame. A specific object detector detects a specific object region in the difference region.

In another aspect of the invention, a detecting method of detecting a specific object region located in a picture frame recorded by an image sensor is provided. In the detecting method, picture frames are created by picking up an object sequentially. A magnification change of magnification is acquired between a present picture frame presently created among the picture frames and a previous picture frame created prior to the present picture frame among the picture frames. An outline frame defined around the previous picture frame is zoomed with a coefficient equal to a reciprocal of the magnification change so as to create a zoomed outline frame, and the previous picture frame is zoomed with a coefficient equal to the magnification change, to obtain a normalized picture frame surrounded in the zoomed outline frame. A difference is retrieved between the present picture frame and the normalized picture frame, to detect a difference region being according to the difference and included in the present picture frame. The specific object region is detected in the difference region.

Also, the specific object detecting step includes shifting a detection target region in the first image to check whether a portion of the difference region is contained in the detection target region. If a matching score is higher than a threshold level according to pattern matching in the detection target region, it is determined that the specific object region is located in the detection target region. If a matching score is equal to or lower than the threshold level according to the pattern matching in the detection target region, checking whether a portion of the difference region is contained in the detection target region is continued further.

The specific object detecting step includes shifting a detection target region of a first size in the first image, to check whether a portion of the difference region is contained in the detection target region. After shifting the detection target region of the first size in the first image, a detection target region of a second size smaller than the first size is shifted in the first image, to check whether a portion of the difference region is contained in the detection target region.

Also, a digital camera for photographing an image of an object is provided, and includes an input unit for acquiring a change of a position of the object in the image or a change of a magnification thereof between a first image and a previous image photographed prior thereto. A normalizer normalizes the previous image according to a normalizing parameter related to the change of the position or magnification. A specific object detector detects a specific object region according to image recognition and by comparison between the first image and the normalized previous image.

The normalizer shifts the previous image surrounded in an outline frame by a normalizing parameter according to the change in the position, to obtain the normalized previous image surrounded in the outline frame being shifted.

Preferably, the normalizer zooms an outline frame defined around the previous image with a coefficient equal to a reciprocal of a magnification change of the magnification so as to create a zoomed outline frame, and also zooms the previous image with a coefficient equal to the magnification change, to obtain the normalized previous image surrounded in the zoomed outline frame.

Furthermore, a difference region detector detects a difference region by retrieving a portion different between the first image and the normalized previous image. The specific object detector detects the specific object region in the difference region.

Also, a computer executable program for detecting a specific object region located in an image of an object is provided, and includes an acquiring program code for acquiring a change of a position of the object in the image or a change of a magnification thereof between a first image and a previous image photographed prior thereto. A normalizing program code is for normalizing the previous image according to a normalizing parameter related to the change of the position or magnification. A specific object detecting program code is for detecting the specific object region according to image recognition and by comparison between the first image and the normalized previous image.

The normalizing program code is for shifting the previous image surrounded in an outline frame by a normalizing parameter according to the change in the position, to obtain the normalized previous image surrounded in the outline frame being shifted.

The normalizing program code is for zooming an outline frame defined around the previous image with a coefficient equal to a reciprocal of a magnification change of the magnification so as to create a zoomed outline frame, and also for zooming the previous image with a coefficient equal to the magnification change, to obtain the normalized previous image surrounded in the zoomed outline frame.

Furthermore, a difference region detecting program code is for detecting a difference region by retrieving a portion different between the first image and the normalized previous image. The specific object detecting program code is for detecting the specific object region in the difference region.

Accordingly, a specific object region can be detected according to image data also at a reduced amount of a task of arithmetic operation and memory resource can be reduced, because of the normalization, and a change of a position of the object in the image or a change of a magnification thereof.

BRIEF DESCRIPTION OF THE DRAWINGS

The above objects and advantages of the present invention will become more apparent from the following detailed description when read in connection with the accompanying drawings, in which:

FIG. 14 is an explanatory view in plan illustrating a previous picture frame shortly before zooming in;

DETAILED DESCRIPTION OF THE PREFERRED EMBODIMENT(S) OF THE PRESENT INVENTION

Figure 1:
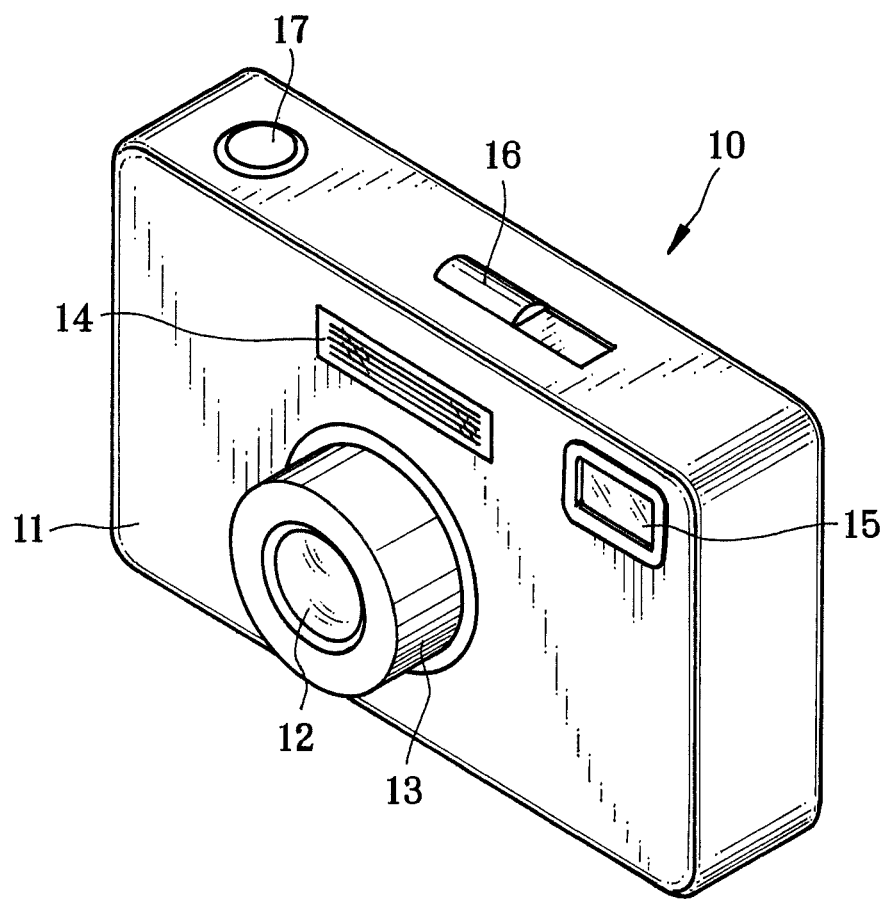
FIG. 1 is a perspective view illustrating a digital still camera.
Figure 2:
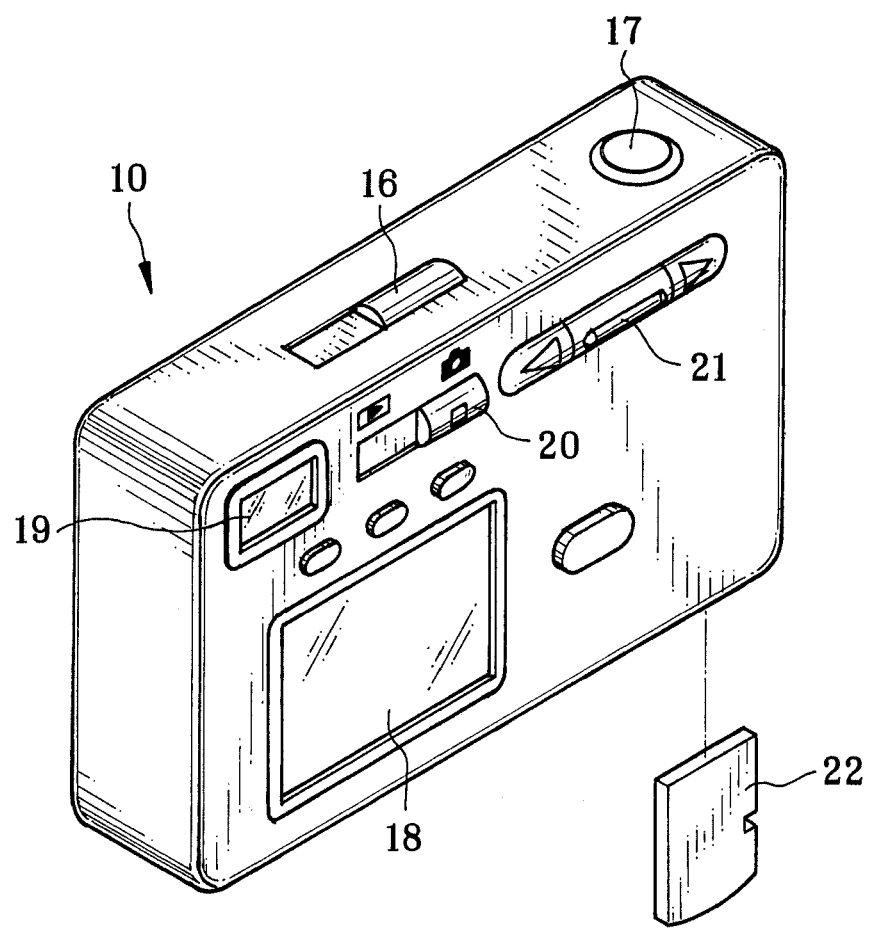
FIG. 2 is a rear perspective view illustrating the digital still camera.

In FIGS. 1 and 2, a digital still camera 10 capable of detecting a facial image region in the invention is described. The digital still camera 10 has a camera body 11. A front surface of the camera body 11 has a lens barrel 13, a flash light source 14 and a viewfinder objective window 15. An image pickup lens 12 is incorporated in the lens barrel 13. An upper surface of the camera body 11 has a power source button 16 and a shutter release button 17. A rear surface of the camera body 11 has a liquid crystal display panel (LCD) 18 for displaying an image or picture frame. A touch panel is incorporated in the display panel 18 and appears externally.

Also, the digital still camera 10 has a viewfinder eyepiece window 19, a mode selector 20, and a zoom button 21. The mode selector 20 is manually operable to set a selected one of a photographing mode and a playback mode. The zoom button 21 is movable up and down pivotally for zooming. A slot (not shown) is formed in a lower face of the camera body 11. A memory card 22 is loaded in the slot. When an image is picked up, image data of the image or picture frame is written to the memory card 22 and stored.

The display panel 18 is a user interface with which command signals are input to the digital still camera 10. The touch panel is constituted by the display panel 18 and indicates operation icons. A finger, input pen (not shown) or the like can contact the touch panel to input signals.

When a user wishes to photograph an image with flash light, the flash light source 14 emits flash light toward an object in synchronism with the release of the shutter. An amount of the flash light is determined according to the object distance, photo sensitivity, aperture stop and the like so as to optimize the exposure amount with the flash light. In a normal setting, flash light is automatically emitted if brightness of the object is equal to or lower than a threshold level, and is not emitted if the brightness is higher than the threshold level.

Figure 3:
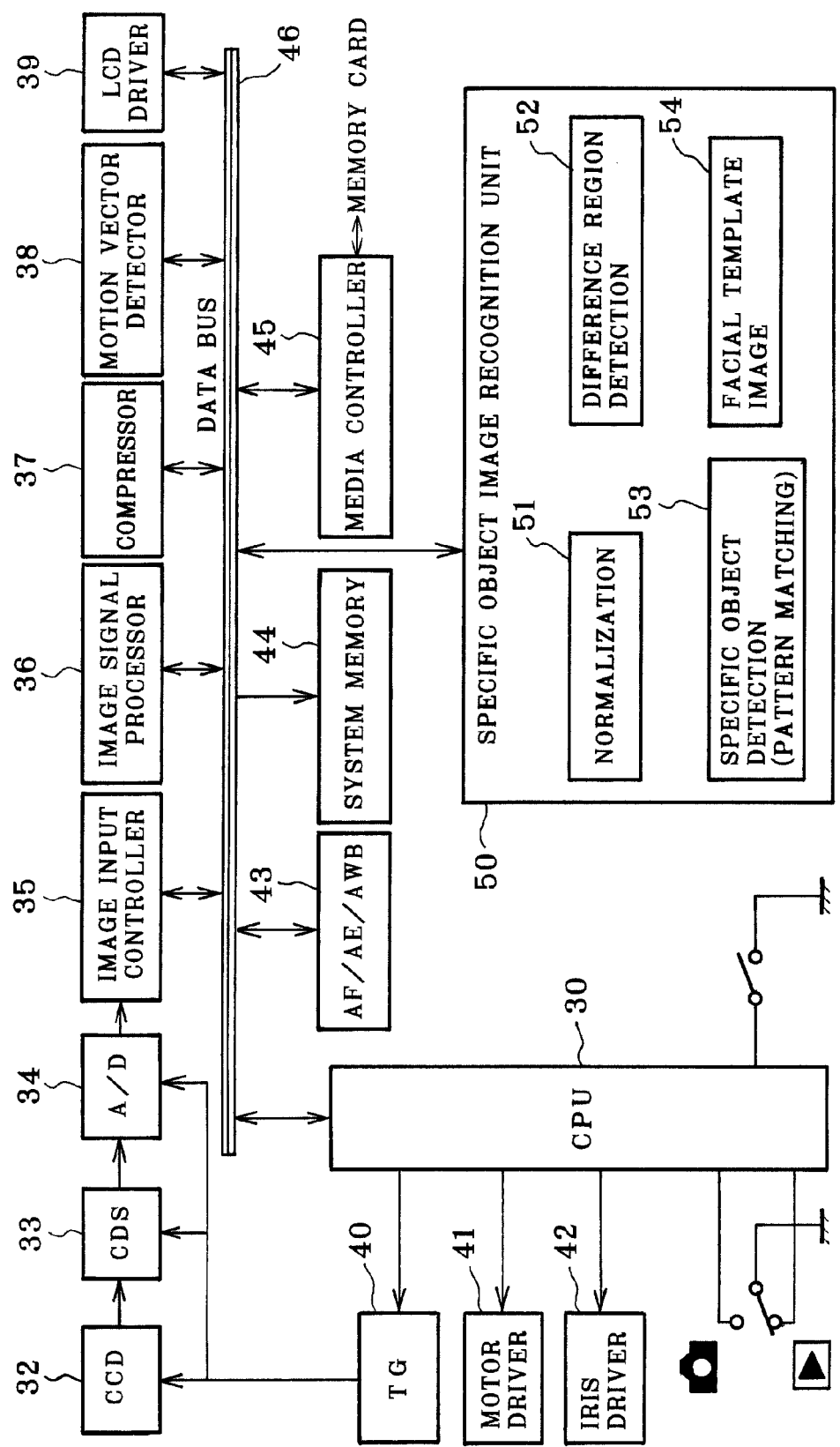
FIG. 3 is a block diagram illustrating the digital still camera.

In FIG. 3, various circuit elements of the digital still camera 10 are illustrated schematically. A CPU 30 in the digital still camera 10 controls those sections in a managed manner. Also, the elements include a CCD 32 as image pickup device, a correlated double sampling circuit (CDS) 33, an A/D converter 34, an image input controller 35, an image signal processor 36, a compressor 37, a motion vector detector 38 as an input unit, an LCD driver 39, a timing generator (TG) 40, a motor driver 41, an iris driver 42, an AF/AE/AWB evaluator 43, a system memory 44, a media controller 45, a data bus 46, and a specific object image recognition unit 50 or image locator. Those elements are mounted on a circuit board (not shown).

The image pickup lens 12 includes a plurality of lenses/lens groups, such as a zoom lens/lens group, focus lens/lens group and the like. A lens motor is driven to move the lenses/lens groups selectively. The lens motor is connected with the motor driver 41 controlled by the CPU 30. The CPU 30 causes the motor driver 41 to drive the lens motor. An aperture stop mechanism is controlled by the iris driver 42 to adjust the aperture of the image pickup lens 12. The iris driver 42 is controlled by the CPU 30.

The CCD 32 is disposed behind the image pickup lens 12. The image pickup lens 12 focuses object light on to a photosensitive surface of the CCD 32. The object light focused by the image pickup lens 12 is received by the CCD 32, which photoelectrically outputs an image signal. The timing generator 40 is connected between the CCD 32 and the CPU 30. The timing generator 40 is controlled by the CPU 30 to generate a timing signal or clock pulse. The CCD 32 is driven in response to the timing signal.

An image signal from the CCD 32 is input to the CDS 33, which generates image data of Red, Green and Blue colors directly according to the stored charge of respective pixels of the CCD 32. The image data from the CDS 33 is amplified by an amplifier, and converted by the A/D converter 34 into image data of a digital form.

The image input controller 35 is connected to the CPU 30 by the data bus 46, and controls the CCD 32, the CDS 33 and the A/D converter 34 in a state monitored by the CPU 30. Image data output by the A/D converter 34 is written to the system memory 44 in a temporary manner. The image input controller 35 sends the image data from the A/D converter 34 to the specific object image recognition unit 50.

The image signal processor 36 reads image data from the system memory 44, and processes the image data in various steps of image processing, such as halftone conversion, gamma correction and the like. Then the image signal processor 36 writes the processed image data to the system memory 44. The image data in the system memory 44 is converted by the LCD driver 39 into a composite signal of an analog form, so that the display panel 18 displays a live image or picture frame according to the image data.

The compressor 37 compresses image data processed by the image signal processor 36 according to the predetermined format of the compression, for example JPEG (Joint Photographic Experts Group) format. The compressed image data is sent to the media controller 45 and written to the memory card 22.

The AF/AE/AWB evaluator 43 is connected to the data bus 46. The AF/AE/AWB evaluator 43 operates to calculate data of an exposure amount, an evaluation value for focus adjustment, and white balance value according to the image data. In the calculation of the exposure amount, the luminance level of the image data output by the A/D converter 34 is integrated for one frame. A value of the integration is acquired as exposure information, which is sent by the data bus 46 to the CPU 30.

To carry out focus adjustment automatically, the AF/AE/AWB evaluator 43 retrieves a component of high luminance from the image signal, and integrates the high luminance component. The AF/AE/AWB evaluator 43 obtains the evaluation value of the focusing, which is sent to the CPU 30. Also, the AF/AE/AWB evaluator 43 detects a white balance value from the image data, and sends the information of the white balance value to the CPU 30. The CPU 30 controls the motor driver 41 and the timing generator 40 according to the result of the detection from the AF/AE/AWB evaluator 43, and adjusts the aperture stop value, white balance value and the like to optimized values. Note that the AF/AE/AWB evaluator 43 is provided with facial image data which will be described later in detail, and performs tasks for processing.

The system memory 44 includes a ROM, RAM and the like, and stores various programs, settings and the like for controlling the digital still camera 10. Also, the system memory 44 is a buffer for temporarily storing a program read by the CPU 30, acquired image data and the like.

The input unit or motion vector detector 38 measures a shift of a casing in which the CCD 32 is contained, and retrieves an amount of the shift between the first picture frame at present and a previous picture frame photographed shortly before the first picture frame.

The specific object image recognition unit 50 includes a normalizer or normalizing step 51, a difference region detector or difference region detecting step 52, a specific object region detector or specific object detecting step 53, and information of a facial template image 54 in a memory area. The normalizer or normalizing step 51 shifts the outline frame defined around the previous picture frame from its initial position according to the shift measured by the motion vector detector 38, to obtain a normalized picture frame which is defined inside the shifted outline frame.

The difference region detector or difference region detecting step 52 compares the first picture frame with the normalized picture frame, and detects a difference region which is defined by eliminating a common image region from those. In the specific object region detector or specific object detecting step 53, a facial image region is recognized by evaluation in the difference region. If no difference region is detected, the information of a facial image region obtained from the previous picture frame is used again and stored.

To detect the facial image region, pattern matching is used as method of image recognition in which any of small regions in the present picture frame is cropped, and existence or lack of the facial image region is detected in the detection target region being cropped. For detecting the existence of the facial image region in the detection target region, the facial template image 54 is used. If no portion of a difference region is contained in the detection target region, then the detected information of the previous picture frame is used and stored by omitting comparison of the detection target region with the facial template image 54. If a portion of a difference region is contained in the detection target region, then the detection target region is evaluated by comparison with the facial template image 54, to detect the facial image region if the matching score is found higher than a threshold value.

Facial image data obtained by the specific object image recognition unit 50 or image locator is sent through the data bus 46 to the AF/AE/AWB evaluator 43. Various tasks are performed in the AF/AE/AWB evaluator 43 according to the facial image data. An AF evaluation value is determined according to the facial image data for focusing on the position of the facial image region in the object. A position of the focus lens is controlled according to the evaluation value. Note that focusing of other methods may be used. For example, a size of the facial image region relative to the whole of the frame is calculated. A focal length is obtained according to the calculated size of the facial image region, so as to adjust the focus. Furthermore, the exposure amount and the white balance value are determined to set the color and luminance in the facial image data in a predetermined range. The aperture stop value and the white balance are optimized according to the obtained exposure amount and white balance value.

Figure 4:
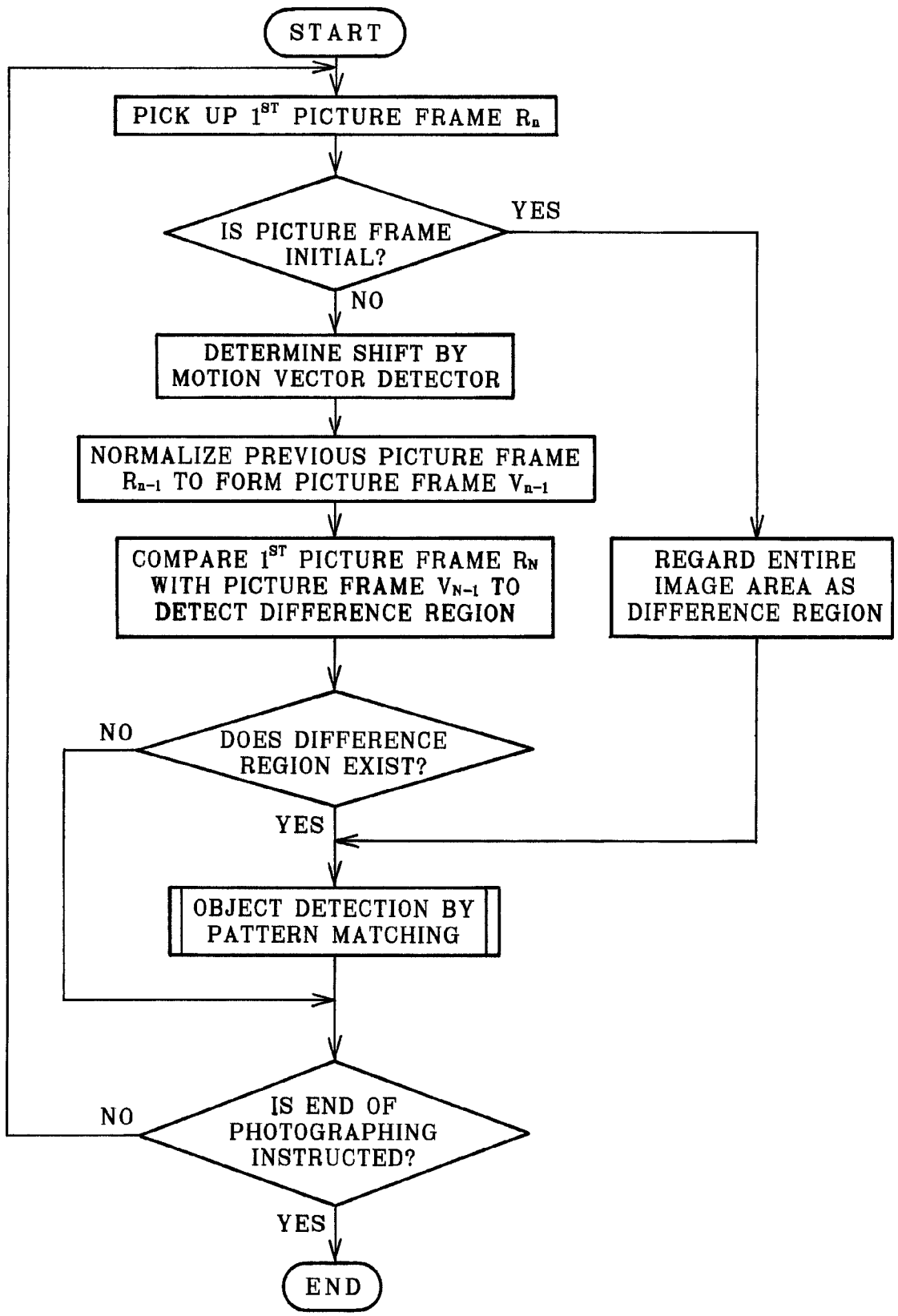
FIG. 4 is a flow chart illustrating a flow of specific object detection.
Figure 6:
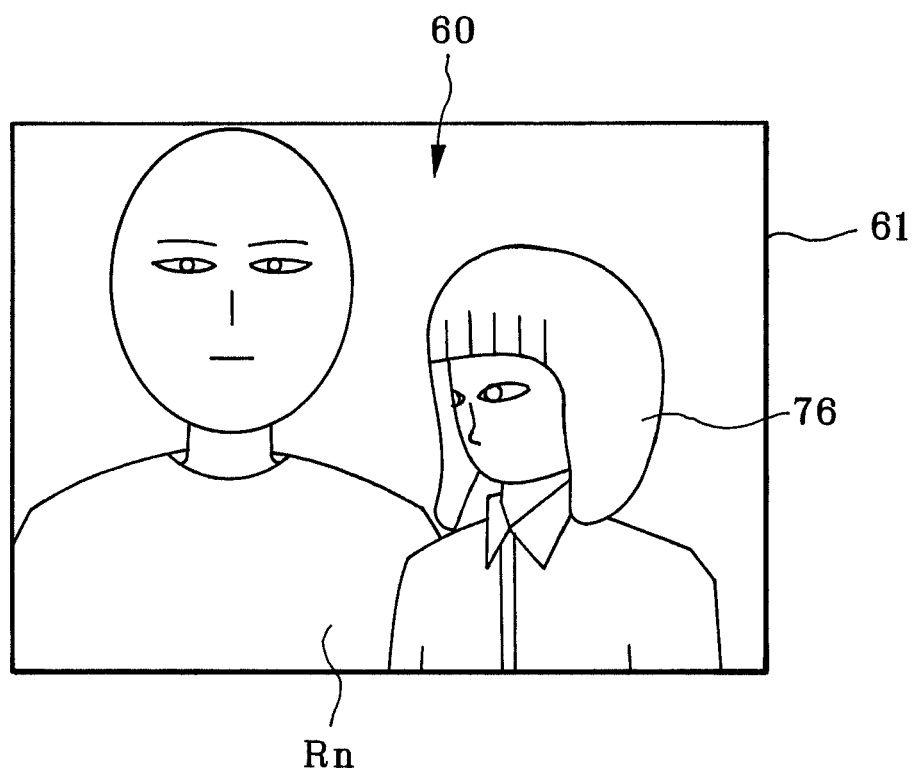
FIG. 6 is an explanatory view in plan illustrating a first picture frame of the present time for specific object detection.

In FIG. 4, a flow of detecting a facial image region in the course of image pickup is illustrated. The digital still camera 10 starts photographing an object 60. It is checked whether that a first picture frame $R_n$ of FIG. 6 is a picture frame arranged at first. If it is, then the entire region of the first picture frame is used as a difference region. In contrast, if there is one or more picture frames before the first picture frame $R_n$, then a previous picture frame directly before the first picture frame $R_n$ is evaluated. The input unit or motion vector detector 38 detects an amount of a shift of an outline frame 61 around the first picture frame or present picture frame relative to an outline frame 62 around the previous picture frame.

Figure 7:
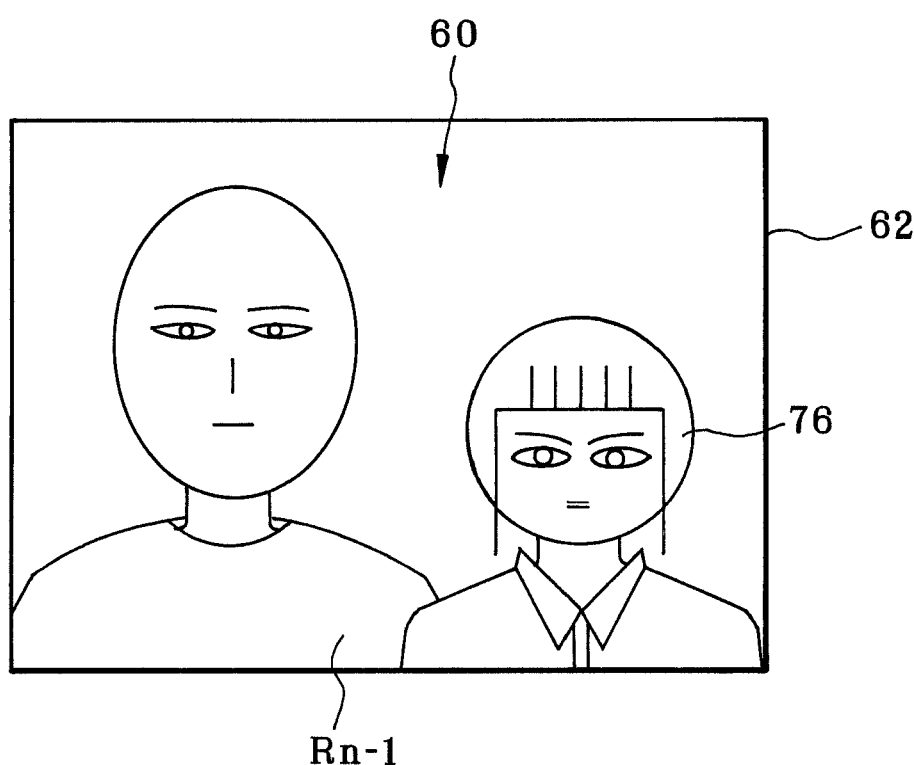
FIG. 7 is an explanatory view in plan illustrating a previous picture frame photographed prior to the first picture frame.
Figure 8:
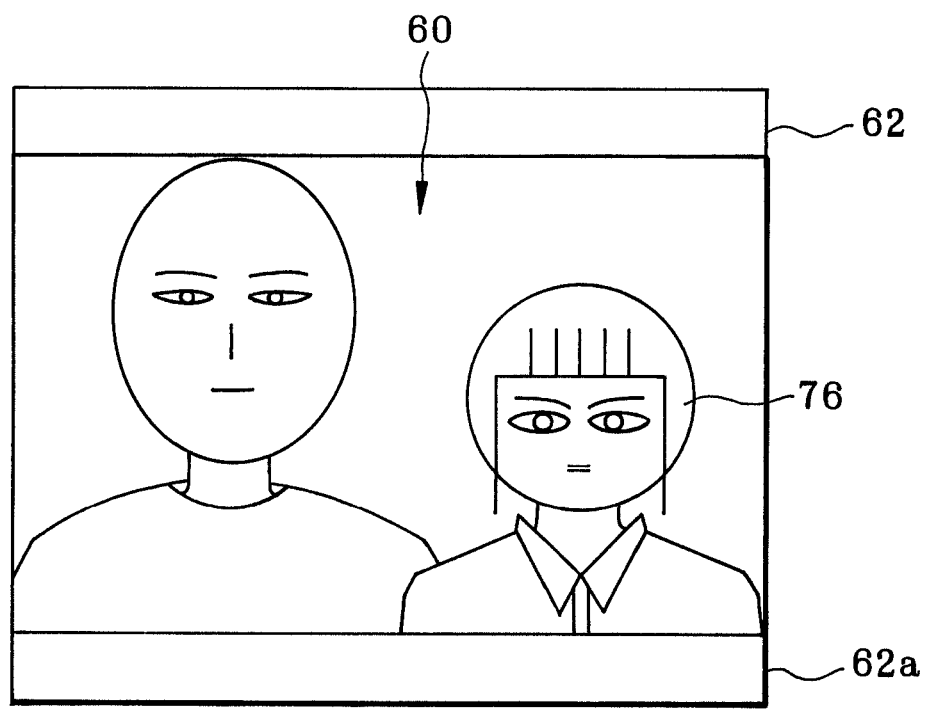
FIG. 8 is an explanatory view in plan illustrating a state of shifting the previous picture frame for normalization.

The outline frame 62 of the previous picture frame $R_{n-1}$ of FIG. 7 is shifted according to the amount of the shift obtained by the motion vector detector 38. See FIG. 8. A picture frame surrounded by an outline frame 62a is acquired as a normalized previous picture frame $V_{n-1}$. See FIG. 9. In the difference region detector or difference region detecting step 52, the first picture frame $R_n$ is compared with the normalized picture frame $V_{n-1}$. A common image region 70 between those is eliminated to obtain a difference region 72 indicated by the dotted portion in FIG. 10. After detecting the difference region 72 of FIG. 11, the first picture frame $R_n$ is evaluated by the specific object region detector or specific object detecting step 53 according to the pattern matching with the facial template image 54.

Figure 5:
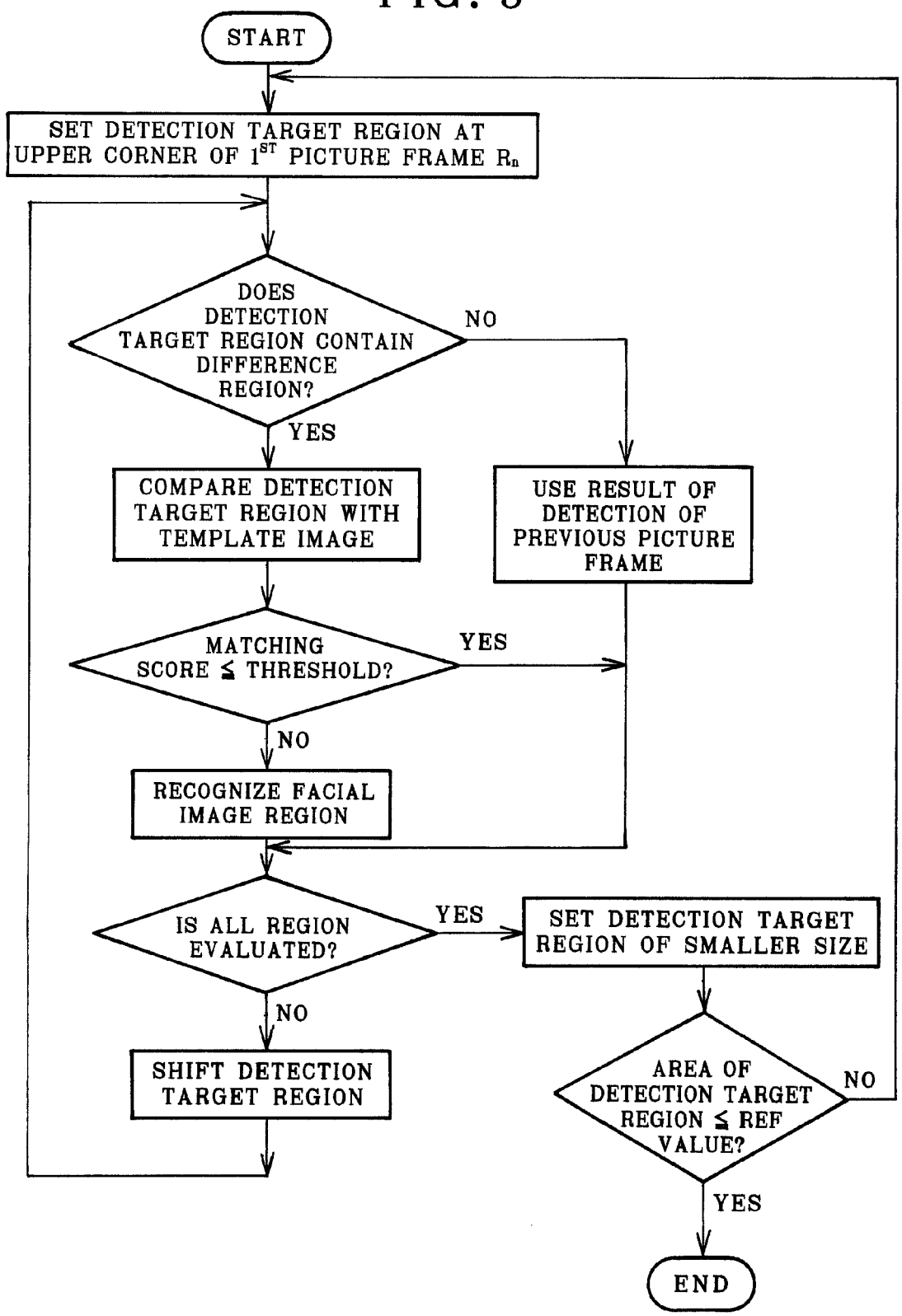
FIG. 5 is a flow chart illustrating a flow of pattern matching as a step in the specific object detection.
Figure 12:
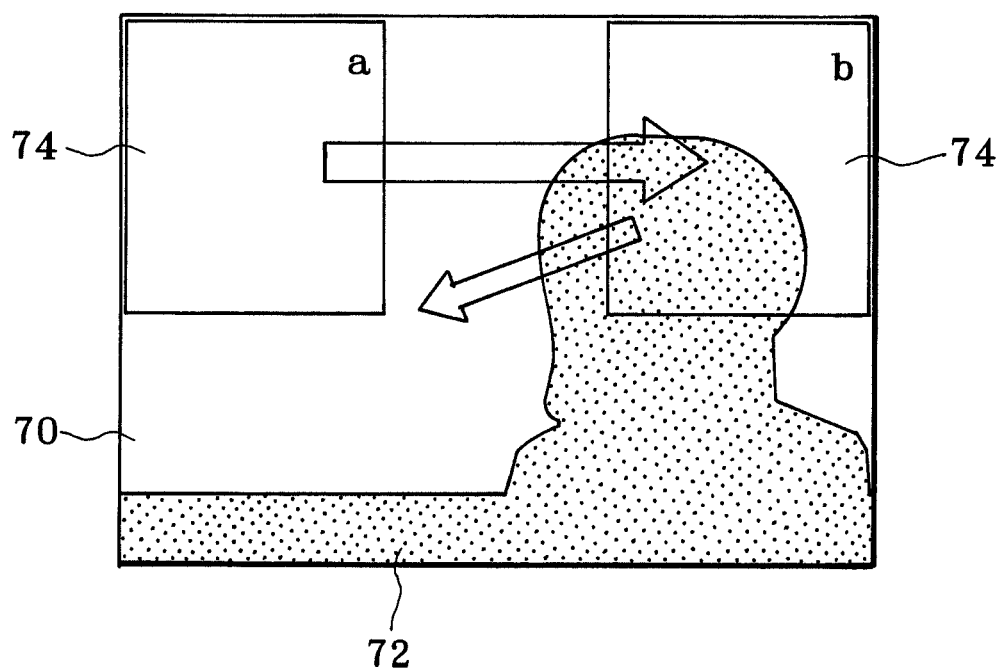
FIG. 12 is an explanatory view in plan illustrating a detection target region of pattern matching in the specific object detecting step.

For the image recognition, the specific object region detector or specific object detecting step 53 is described now by referring to the flow in FIG. 5. A detection target region 74 of pattern matching is predetermined with a constant size. In the specific object region detector 53, the detection target region 74 is set and positioned at an upper left corner of the present picture frame $R_n$ as indicated by the sign a in FIG. 12. No difference region 72 is contained in the range of the detection target region 74. So no pattern matching is carried out. The information of the detected facial image region of the previous picture frame is used and stored similarly.

Then the detection target region 74 of pattern matching is shifted toward the right. It is checked whether a portion of the difference region 72 is contained in the detection target region 74. The sign b of FIG. 12 designates the upper right corner of the frame region. The detection target region 74 at this point contains a portion of the difference region 72. Then the detection target region 74 is subjected to the pattern matching with the facial template image 54 to evaluate the correlation. If a matching score of the pattern matching is equal to or less than a threshold value, then no facial image region 76 as specific object region is found to exist. If the matching score of the pattern matching is more than the threshold value, then the facial image region 76 is found to exist. The facial image region 76 is stored as new information in place of the previous information of the facial image region 76.

Figure 13:
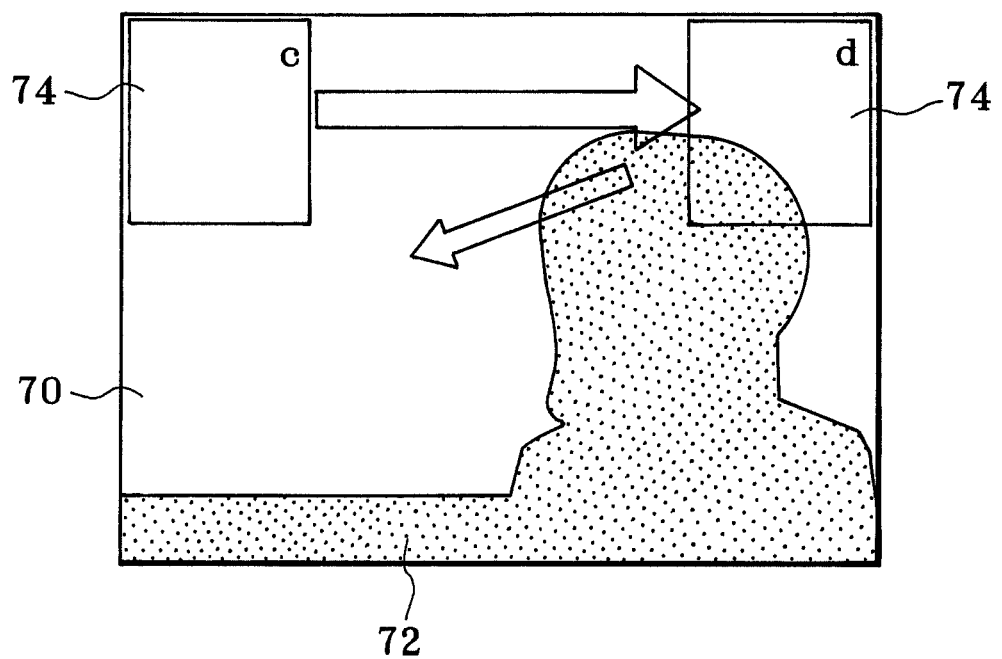
FIG. 13 is an explanatory view in plan illustrating a state of the detection target region of a reduced size.

Similarly, the detection target region 74 of pattern matching is shifted consecutively to detect a facial image region repeatedly. When the facial image region detection is ended at the lower right corner of the frame region, then the size of the detection target region 74 is reduced. The detection target region 74 of the smaller size starts shifting from the upper left corner of the frame region at the area of the sign c of FIG. 13. Coincidence of the facial image region is checked repeatedly. If the size of the detection target region 74 is equal to or smaller than a predetermined value in the course of detection with the detection target region 74 of the reduced size, then the operation of the specific object region detector or specific object detecting step 53 is ended. For all of the images or picture frames photographed by the digital still camera 10, the sequence including the end of the specific object detecting step 53 is repeated.

Figure 9:
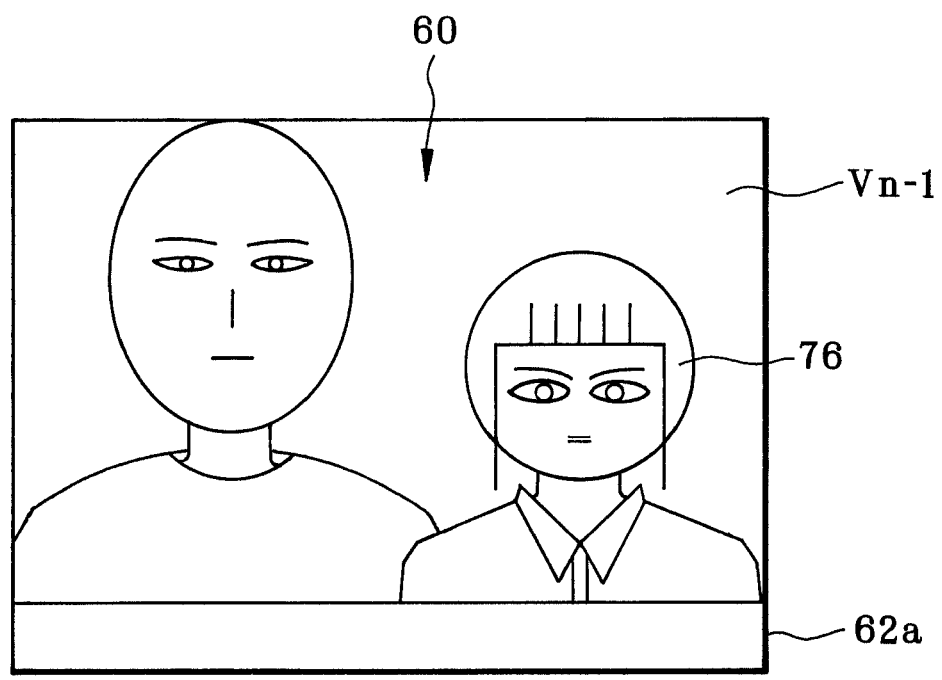
FIG. 9 is an explanatory view in plan illustrating a normalized previous picture frame.
Figure 14:
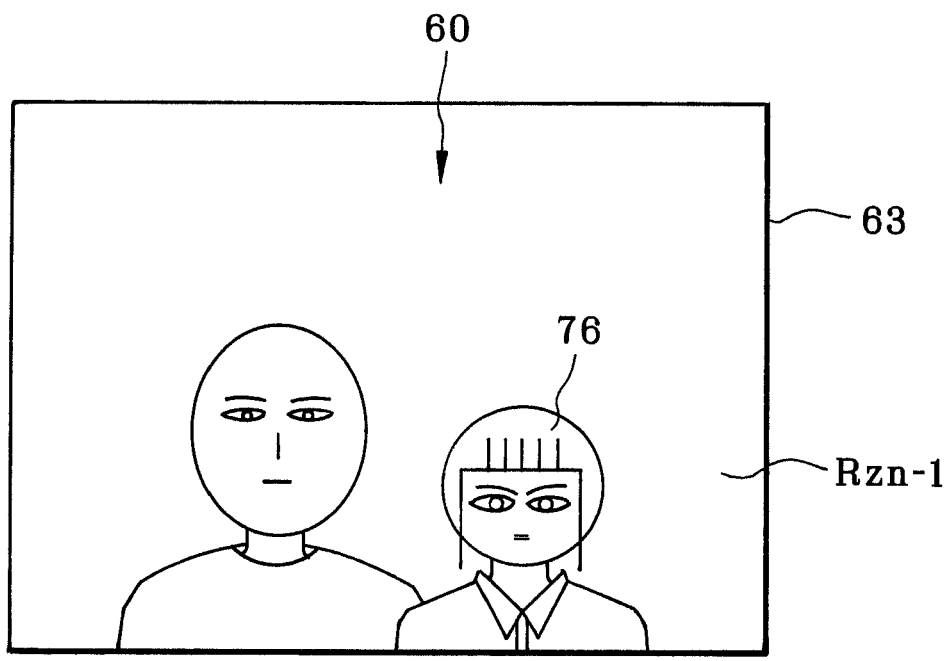
Figure 15:
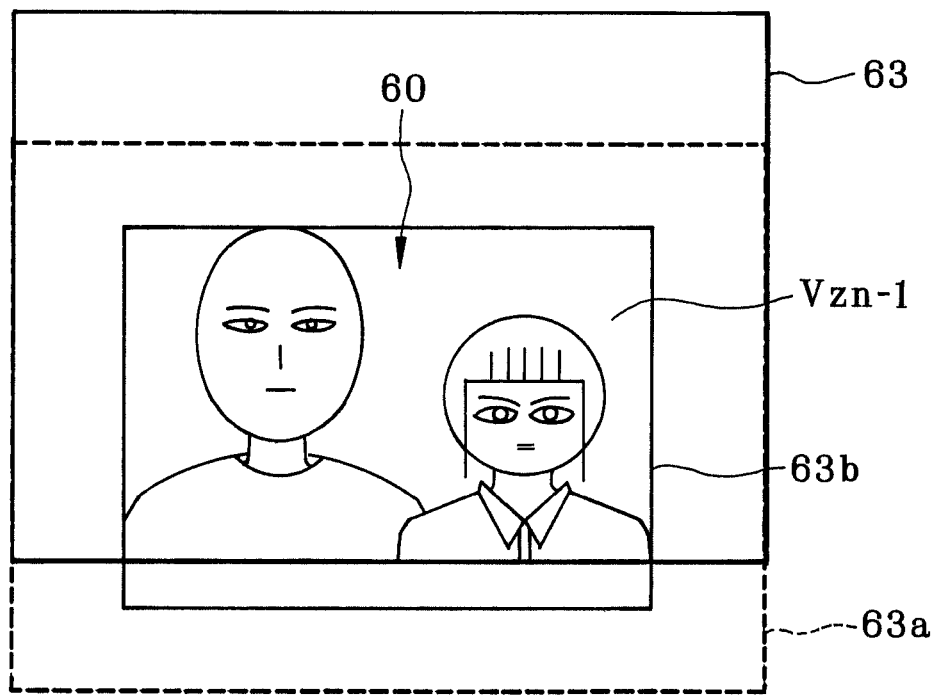
FIG. 15 is an explanatory view in plan illustrating a state of shifting the previous picture frame for normalization.

A preferred embodiment is described now, in which the digital still camera 10 is tilted down and also zoomed in for an object. Zooming information according to optical zooming or electronic zooming is transmitted to a magnification change acquiring step in which a magnification change between two magnifications of the picture frame is measured. An outline frame 63 surrounding the previous picture frame $Rz_{n-1}$ of FIG. 14 shortly before zooming in is shifted according to the amount of the shift obtained by the input unit or motion vector detector 38, so that an outline frame 63a is created. Then, in a magnification change acquiring step, the outline frame 63a is zoomed by a ratio equal to a reciprocal of the magnification change. Then a picture frame $Vz_{n-1}$ of FIG. 15 surrounded by an outline frame 63b after the zooming is zoomed by a ratio equal to the magnification change, so that a normalized picture frame $V_{n-1}$ of FIG. 9 is obtained.

Figure 10:
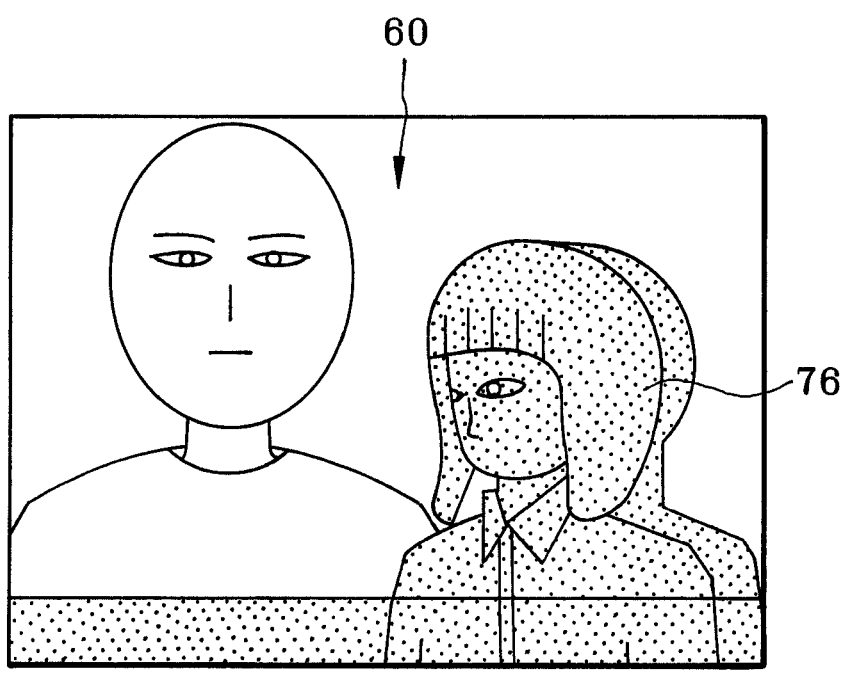
FIG. 10 is an explanatory view in plan illustrating a state of the normalized previous picture frame overlapped on the first picture frame.
Figure 11:
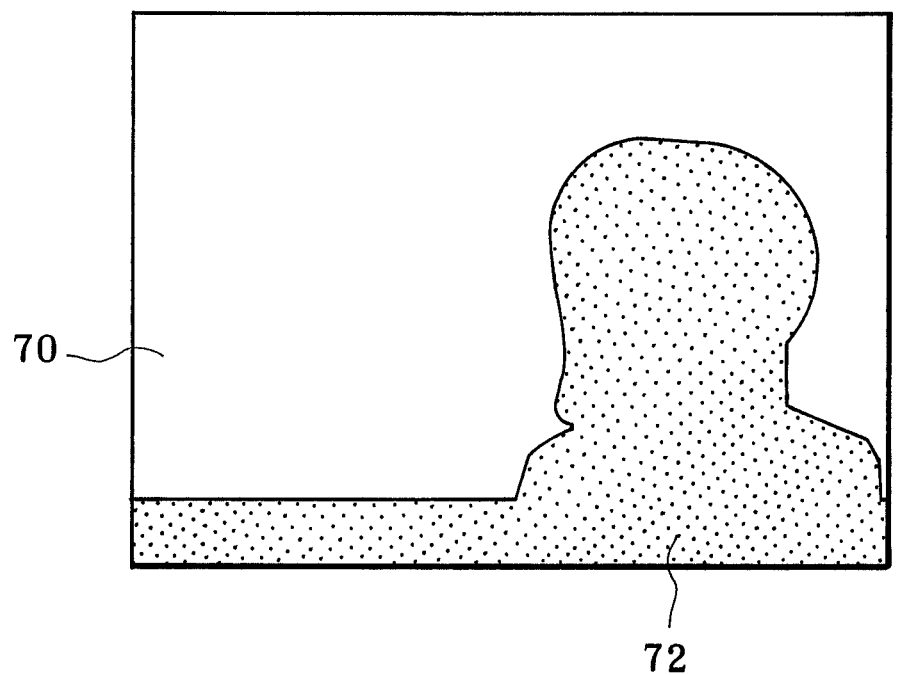
FIG. 11 is an explanatory view in plan illustrating a difference region and a common image region.

Thus, the first picture frame $R_n$ is compared with the normalized previous picture frame $V_{n-1}$ in a manner similar to FIG. 10. The difference region 72 is detected by the difference region detector or difference region detecting step 52. In the specific object region detector or specific object detecting step 53, the difference region 72 is evaluated by the pattern matching with the facial template image 54, to check existence or lack of the facial image region 76 as specific object region.

Figure 16:
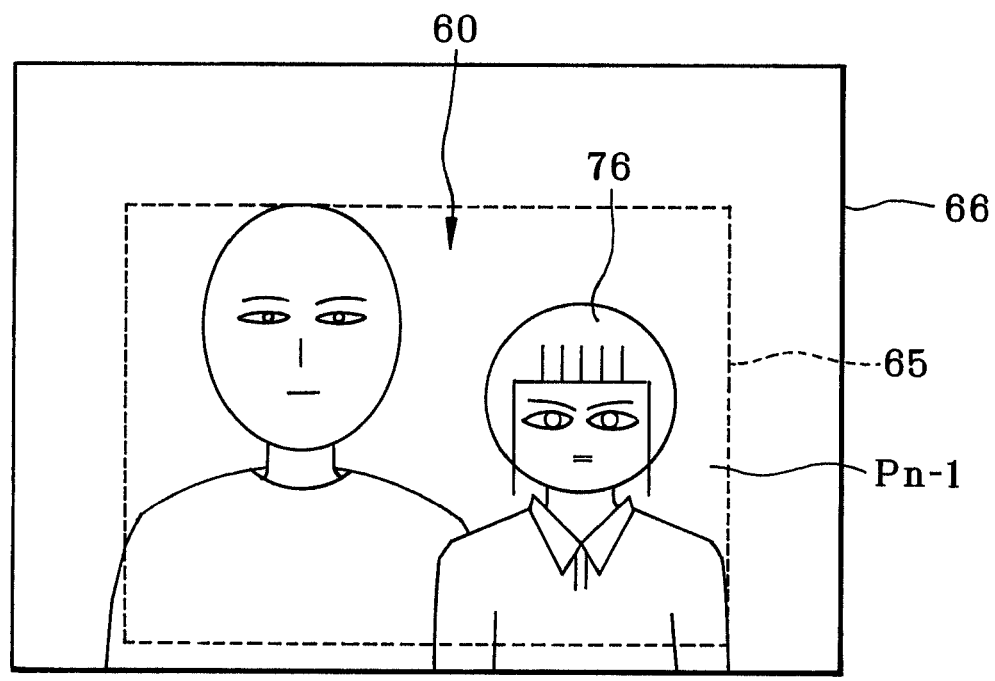
FIG. 16 is an explanatory view in plan illustrating another preferred embodiment with a previous picture frame with an enlarged size.

Another preferred embodiment is described by referring to FIG. 16. Features of the above embodiments are repeated with differences which are hereinafter described. An effective size of the picture frame observed in the playback of the digital camera is determined smaller than the entire image area photographable with the image sensor or the CCD 32 in the digital still camera 10. In the normalizing step, a size of an outline frame 66 around the previous picture frame is set at the entire image area relative to the CCD 32.

Figure 17:
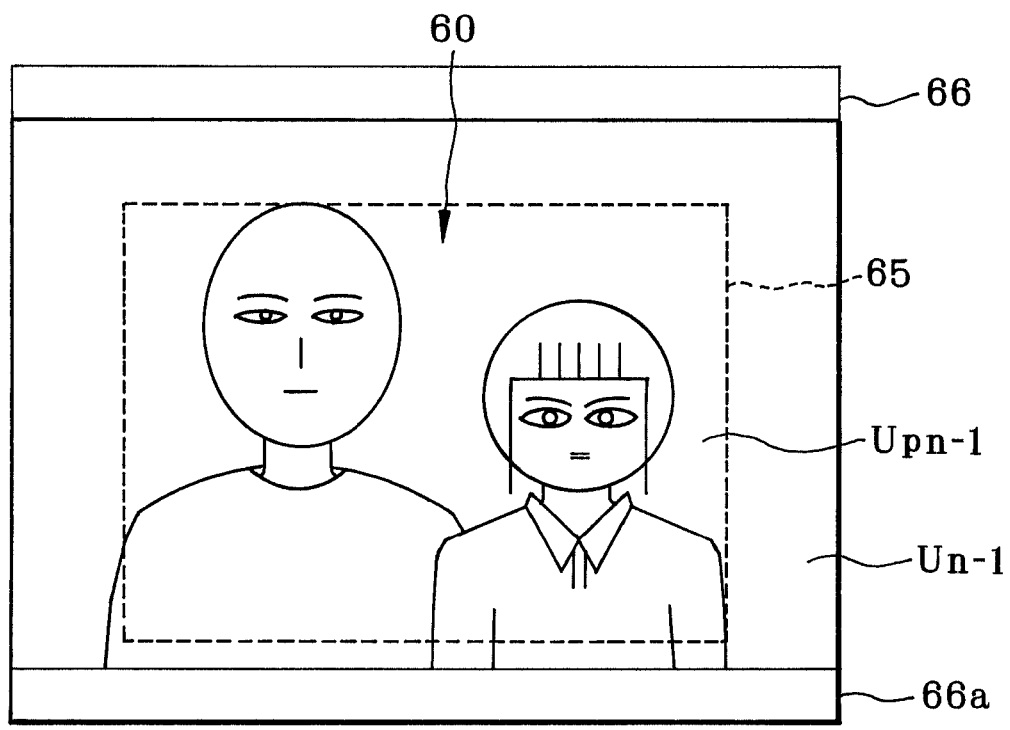
FIG. 17 is an explanatory view in plan illustrating a state of shifting the previous picture frame for normalization.

The outline frame 66 of the previous picture frame $P_{n-1}$ of FIG. 16 is shifted from the initial position according to the amount of the shift obtained by the input unit or motion vector detector 38. A picture frame defined inside an outline frame 66a is acquired as a normalized previous picture frame $U_{n-1}$ of FIG. 17. In general, an amount of the shift of the outline frame is small when picture frames are photographed shortly one after another in one scene. Thus, the position of an outline frame 65 around a first picture frame or present picture frame does not shift out of the outline frame 66a after the shift. The region $Up_{n-1}$ of FIG. 18 in the normalized picture frame $U_{n-1}$ for comparison with the outline frame 65 does not contain a blank region in the manner of the normalized picture frame $V_{n-1}$ of FIG. 9 in the above embodiment.

Figure 18:
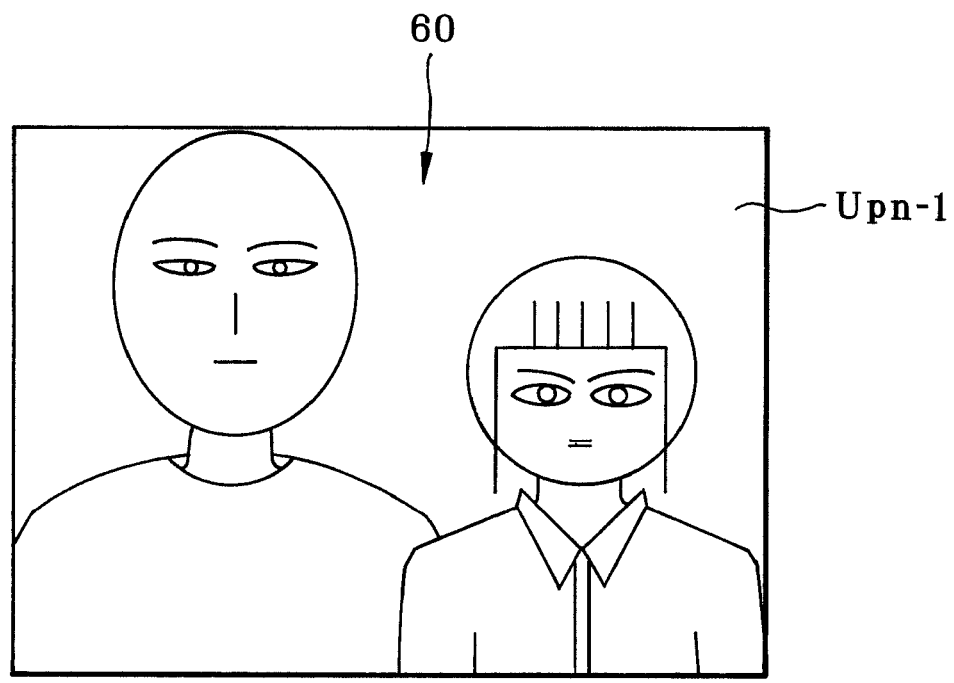
FIG. 18 is an explanatory view in plan illustrating a comparison region of the normalized previous picture frame.
Figure 19:
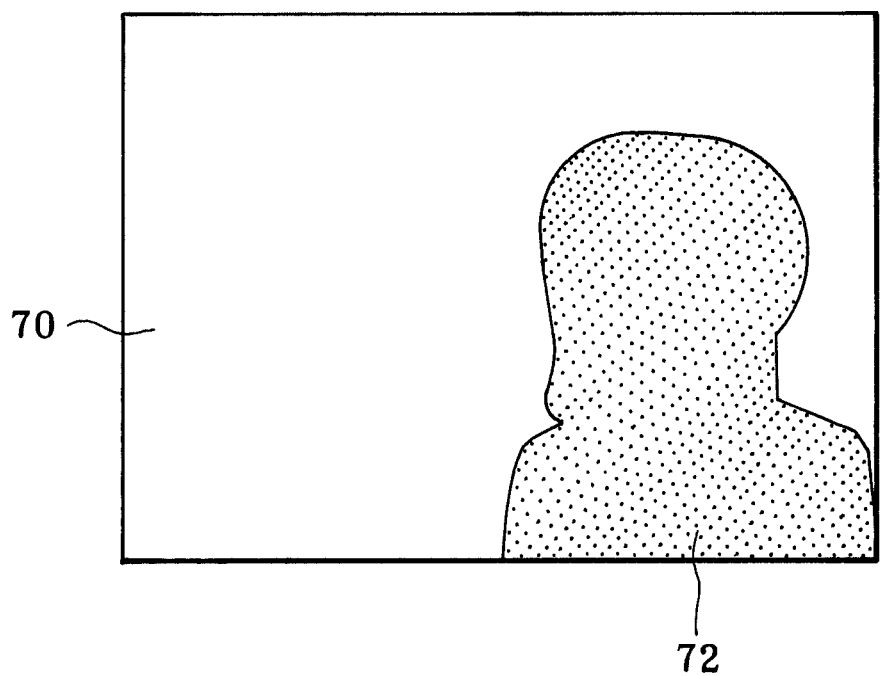
FIG. 19 is an explanatory view in plan illustrating a difference region.

The difference region detector or difference region detecting step 52 compares the first picture frame $P_n$ of FIG. 6 with a portion $Up_{n-1}$ of FIG. 18 in the normalized picture frame, and detects the difference region 72 of FIG. 19 which is defined by eliminating a common image region from those. The difference region 72 is smaller than that according to the above embodiment in FIG. 11 indicated by the dotted portion. An area used in the pattern matching in the specific object region detector or specific object detecting step 53 with the facial template image 54 is smaller than that in the above embodiment. This is effective in raising the efficiency in the evaluation for image recognition.

In the embodiment, the size of the outline frame 66 in the normalizing step is set as the entire image area photographable by the image sensor. However, it is possible in the invention to determine the size of the outline frame 66 larger than the entire image area of the image sensor.

As described heretofore, the digital still camera 10 is capable of recognizing a facial image region of the object 60 as a person, so as to use the various functions of the photography. The auto focusing (AF) device can be effectively used, as a point of the rangefinding is set at the detected facial image region, to focus sharply without fail. The auto exposure (AE) device can be effectively used, as brightness of the object 60 can be measured by photometry of light reflected by the facial image region, to optimize the exposure level properly without influence of brightness of surrounding areas. Also, the white balance adjuster (AWB) can be effectively used, as flesh color of the facial image region can be detected to optimize the white balance of the picture frame.

In the embodiment, the input unit or motion vector detector 38 is used for detecting a shift of the picture frame. However, an angular velocity sensor may be used instead for detecting a shift of a picture frame.

In the above embodiment, the specific object region is a facial image region. However, a specific object region for detection in the invention may be an image other than a facial image region.

Although the pattern matching method is used in the above, a method of the image recognition in the invention can be any suitable one of various methods known in the image recognition.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A detecting method of detecting a specific object region located in a picture frame recorded by an image sensor, comprising steps of:
    sequentially creating picture frames by picking up an object sequentially;
    acquiring a shift amount between a present picture frame presently created among said picture frames and a previous picture frame created prior to said present picture frame among said picture frames;
    shifting an outline frame defined around said previous picture frame according to said shift amount on said previous picture frame, to form a normalized picture frame from an image region surrounded in said outline frame after shifting;
    retrieving a difference between said present picture frame and said normalized picture frame, to detect a difference region according to said difference and included in said present picture frame;
    detecting said specific object region in said difference region by searching said specific object region in said difference region, said searching being performed by shifting a detection region in said difference region,
    wherein if there is a lack of said difference region in said difference region detection for said present picture frame, said information of said specific object region obtained for said previous picture frame is used for said present picture frame;
    wherein an amount of shifting of a casing in which said image sensor is incorporated is measured from photographing said previous picture frame to photographing said present picture frame, and is used for said shift amount between said present picture frame and said previous picture frame; and
    wherein said specific object region is a human facial image region; and
    wherein the step of detecting said specific object region is performed on all of said sequentially created picture frames.

2. A detecting method as defined in claim 1, wherein pattern matching of image recognition is used in detecting said specific object region from said difference region.

3. A detecting method as defined in claim 1, wherein said image sensor has a large pickup area containing a photographable area for picking up an image to be observed in playback, and said previous picture frame and said present picture frame are picked up in said large pickup area.

4. A digital camera for pickup of a picture frame, comprising:
- an image sensor for sequentially creating picture frames by picking up an object sequentially;
- an input unit for acquiring a shift amount between a present picture frame presently created among said picture frames and a previous picture frame created prior to said present picture frame among said picture frames;
- a normalizer for shifting an outline frame defined around said previous picture frame according to said shift amount on said previous picture frame, to form a normalized picture frame from an image region surrounded in said outline frame after shifting;
- a difference region detector for retrieving a difference between said present picture frame and said normalized picture frame, to detect a difference region according to said difference and included in said present picture frame;
- a specific object detector for detecting a specific object region in said difference region by searching said specific object region in said difference region, said searching being performed by shifting a detection region in said difference region and said detecting of the specific object region being performed on all of said sequentially created picture frames.

5. A detecting method of detecting a specific object region located in a picture frame recorded by an image sensor, comprising steps of:
- sequentially creating picture frames by picking up an object sequentially; acquiring a magnification change of magnification between a present picture frame presently created among said picture frames and a previous picture frame created prior to said present picture frame among said picture frames;
- zooming an outline frame defined around said previous picture frame with a coefficient equal to a reciprocal of said magnification change so as to create a zoomed outline frame, and zooming said previous picture frame with a coefficient equal to said magnification change, to obtain a normalized picture frame surrounded in said zoomed outline frame;
- retrieving a difference between said present picture frame and said normalized picture frame, to detect a difference region according to said difference and included in said present picture frame;
- detecting said specific object region in said difference region by searching said specific object region in said difference region, said searching being performed by shifting a detection region in said difference region,
- wherein if there is a lack of said difference region in said difference region detection for said present picture frame, said information of said specific object region obtained for said previous picture frame is used for said present picture frame;
- wherein pattern matching of image recognition is used in detecting said specific object region from said difference region; and
- wherein said specific object region is a human facial image region; and
- wherein the step of detecting said specific object region is performed on all of said sequentially created picture frames.

6. A detecting method as defined in claim 5, wherein said image sensor has a large pickup area containing a photographable area for picking up an image to be observed in playback, and said previous picture frame and said present picture frame are picked up in said large pickup area.

7. A digital camera for pickup of a picture frame, comprising:
- an image sensor for sequentially creating picture frames by picking up an object sequentially;
- an input unit for acquiring a magnification change of magnification between a present picture frame presently created among said picture frames and a previous picture frame created prior to said present picture frame among said picture frames;
- a normalizer for zooming an outline frame defined around said previous picture frame with a coefficient equal to a reciprocal of said magnification change so as to create a zoomed outline frame, and zooming said previous picture frame with a coefficient equal to said magnification change, to obtain said normalized picture frame surrounded in said zoomed outline frame;
- a difference region detector for retrieving a difference between said present picture frame and said normalized picture frame, to detect a difference region according to said difference and included in said present picture frame;

a specific object detector for detecting a specific object region in said difference region by searching said specific object region in said difference region, said searching being performed by shifting a detection region in said difference region, wherein said detecting of the specific object region is performed on all of said sequentially created picture frames.

* * * * *